INVENTOR.
MELVIN N. JANAPOL

July 20, 1965 M. N. JANAPOL 3,195,347
BEDDING TESTING MACHINE
Filed May 17, 1962 3 Sheets-Sheet 2

INVENTOR.
MELVIN N. JANAPOL
BY
AGENT

July 20, 1965   M. N. JANAPOL   3,195,347
BEDDING TESTING MACHINE
Filed May 17, 1962   3 Sheets-Sheet 3
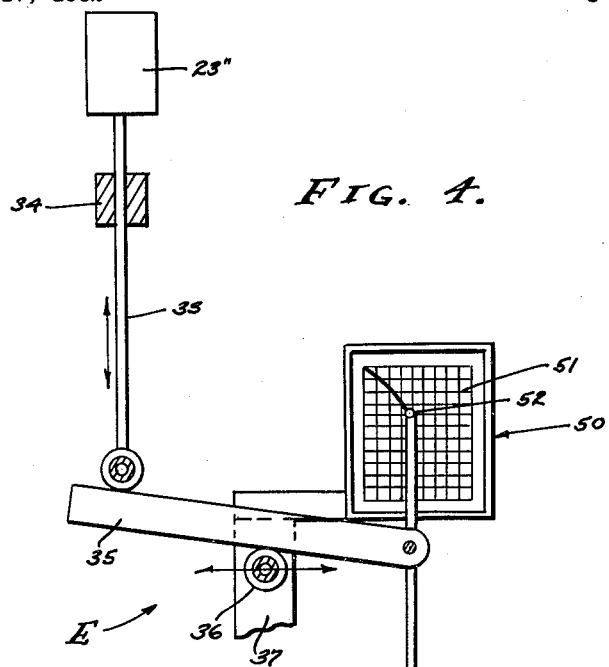
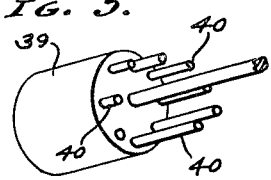
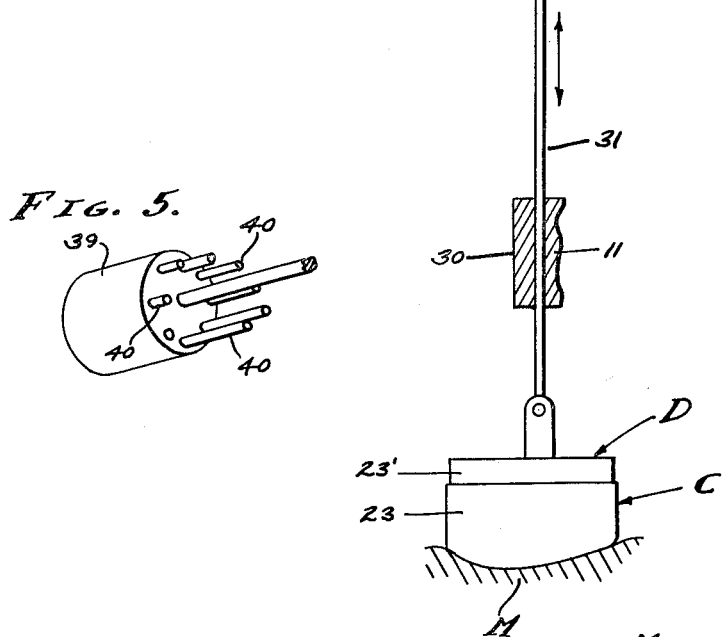
INVENTOR.
MELVIN N. JANAPOL
BY W. H. Maxwell
AGENT

United States Patent Office 3,195,347
Patented July 20, 1965

3,195,347
BEDDING TESTING MACHINE
Melvin N. Janapol, Los Angeles, Calif., assignor to Wortso Corporation, Los Angeles, Calif., a corporation of California
Filed May 17, 1962, Ser. No. 195,558
5 Claims. (Cl. 73—94)

This invention relates to a bedding testing machine and is particularly concerned with the depressing of the human form into mattresses or the like whereby the functions of the mattress can be observed and recorded.

Mattress testing has been done in the past, but not realistically and according to natural weights and articulations of the human anatomy. Generally, it is recognized that the human being suffers from certain muscular and skeletal problems, for example, spinal conditions resulting from incorrect posture or from injury. In any case, resort is made to various modifications in bedding upon which said persons lie, the purpose being to correct and alleviate malconditions of said person. Obviously, different persons vary greatly in stature, weight and contour, and for this reason a device for simulating different persons must be versatile, it being the general object of this invention to provide means whereby depression of the human form into a mattress is simulated.

The modifications to bedding can vary widely, as prescribed by qualified persons having a knowledge of the problems involved and of the requirements to be made of the bedding. However, heretofore no adequate means has been provided by which a qualified person could properly determine the particular characteristics of a given mattress subjected to the weight and depression afforded by a given person. Therefore, it is an object of this invention to provide means whereby the characteristics of a particular mattress can be determined when subjected to a particular load, all to the end that knowledgeable persons can be apprised of the mattress functions that result when applying a certain specified load.

Another problem is that of determining whether or not a particular mattress follows or coincides with the prescription used in its construction, and further, whether or not said prescription is or is not effective as contemplated. With the present invention, simulated depression of a particular specified human form can be applied to a mattress and the precise results observed, it being an object of this invention to observe and record the results of depressing specified human forms into mattresses.

This invention has for its main object the natural application of the human form, by simulation, to a mattress. Therefore, the machine includes the simulated parts of the human body in their natural shape and related to each other as they are articulated in natural life.

More specifically, this invention has for its object to vary the weights applied to the various simulated parts of the human body, whereby human forms of various specified characteristics can be simulated.

The various objects and features of this invention will be fully understood from the following detailed description of the typical preferred form and application thereof, throughout which description reference is made to the accompanying drawings, in which:

FIG. 1 is a side elevation of the mattress testing machine, with a spring unit and mattress accommodated therein and undergoing a testing operation.

FIGS. 2 and 3 are sectional views taken as indicated by lines 2—2 and 3—3 on FIG. 1.

FIG. 4 is a fragmentary view of the machine, showing one complete weight controlling mechanism and a recording means.

FIG. 5 is a perspective view showing the part provided for controlling the amount of weight.

Figure 1:
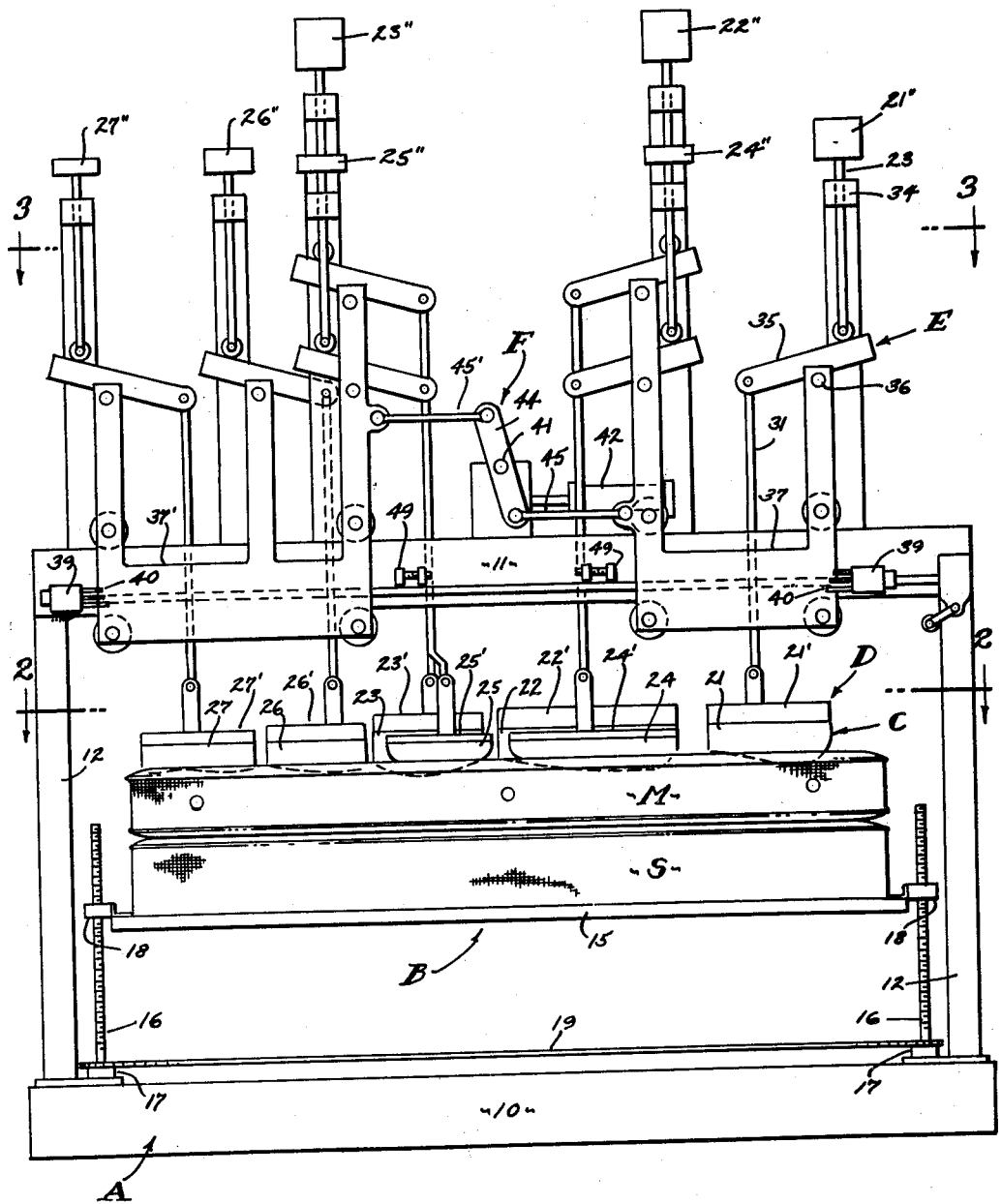
Figure 2:
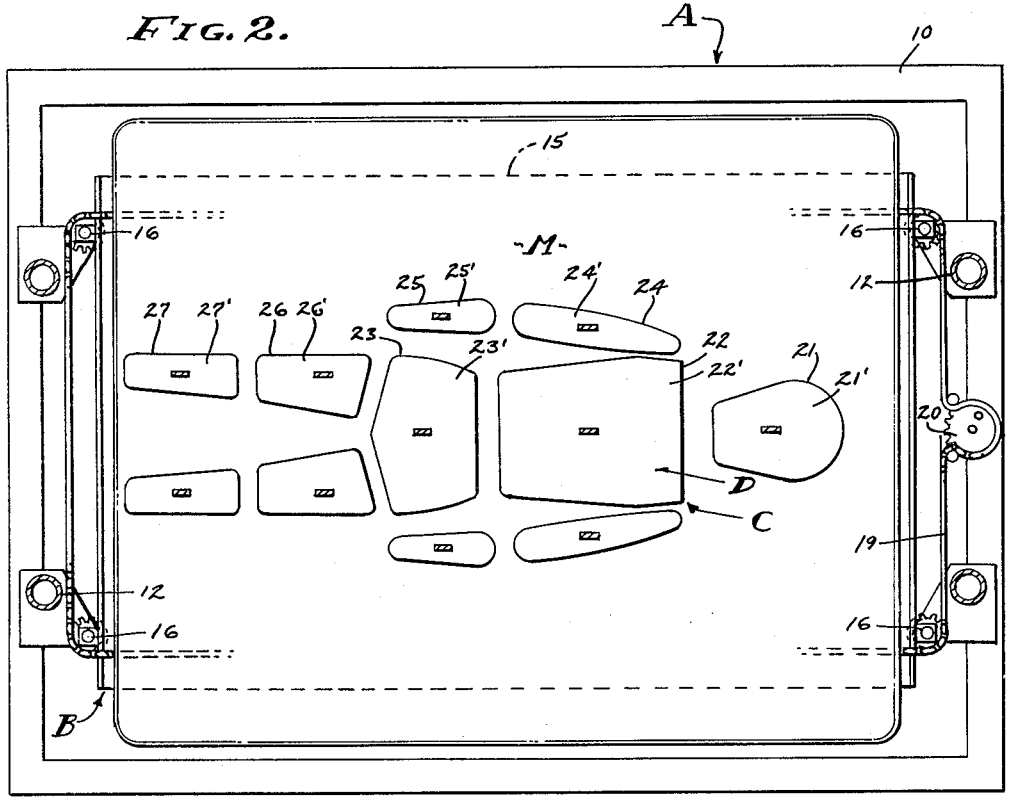
Figure 3:
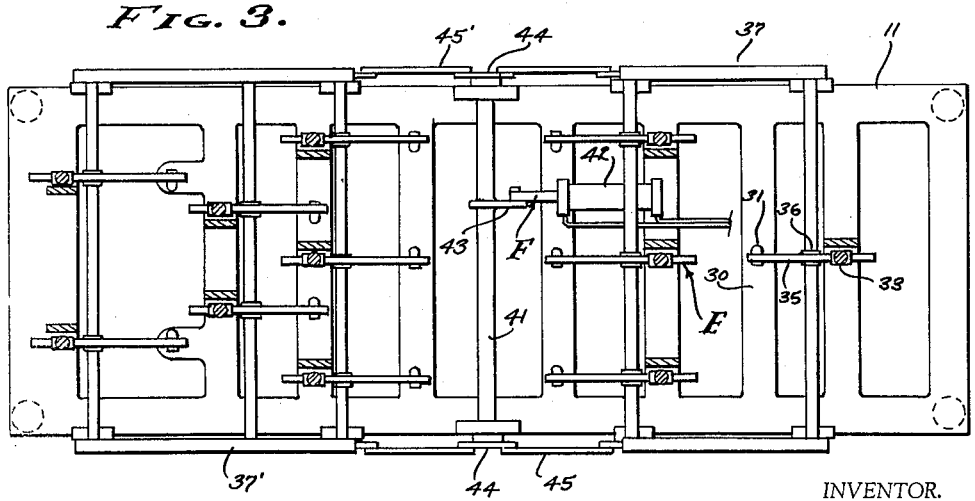

The machine herein disclosed is suited for testing of mattresses or the like, and this includes the box springs that are usually employed to underlie a mattress, it being important that the exact environment be simulated for a particular application of weight by the human form. Therefore, various sized bedding units are to be accommodated within the machine and the position of the bedding units is adjustable relative to the human body form to be depressed therein. Also, variations in human body form can be accommodated by the machine simply by installing body part controus of the required and specified size and shape.

As shown in the drawings, the machine involves, generally, a frame A, a mattress holding means B, a plurality of parts C simulating the parts of the human body form, a weight means D to press the parts C individually, a weight control means E to limit the weight means D, and a drive means F to apply and withdraw the weight of means D as controlled by means E. In the particular case illustrated the machine is fabricated of structural metal sections, preferably steel angles, channels and bars, etc., all welded and fastened together as a unit, all as circumstances require.

The frame A is an elongated rectangular structure that is horizontally disposed, the weight of depression being applied to a mattress in a vertical gravitational direction. The frame A is dimensionally larger than any mattress to be tested and is adapted to accommodate any smaller sizes. The frame A has a base 10 and a header 11 with pedestals 12 therebetween to hold the header 11 placed substantially above the base 10. The frame A made up of parts 10–12 is a rigid structure, the rectangular configuration of the parts 10 and 11 being in spaced parallel horizontally disposed planes.

The mattress M to be tested can vary widely in shape and detail of construction, and this is also true of the box springs S to be tested. Generally, the mattress M and box spring S are rectangular pad-shaped elements composed of flat top and bottom sides comprised of padding covered with ticking and with coil springs therebetween. The springs and padding vary widely, and generally speaking, it is the function of said springs and padding that is to be tested. Therefore, either a mattress M or box spring S, or both, are to be tested. Further, the overall thicknes of said mattresses M and/or springs S can vary greatly.

The mattress holding means B is a controllably shiftable table 15 that overlies the base 10 and underlies the header 11 of the frame A. The table 15 is a flat rectangular element substantially co-extensive with the base 10 and it is shiftable to be positioned in any desired horizontal plane between elements 10 and 11. As shown, there is a screw jack 16 at each corner of the table 15. The screw jacks 16 are vertically disposed in supporting bearings 17 and they thread into nuts 18 carrying the table 15. The jacks 16 are geared together as by a drive chain 19 that is actuated by a hand operated gear 20, crank driven. In any case, the screw jacks 16 are operated in unison to lift and lower the table 15. Thus, the box spring S and/or mattress M can be supported upon the table 15 and selectively positioned beneath the header 11.

The plurality of parts C that simulate the parts of the human body form are; the head 21, the thorax 22, the pelvis 23, the pair of upper arms 24, the pair of lower arms 25, the pair of upper legs 26, and the pair of lower legs 27. In actual practice, the hands and feet can be eliminated or included in to lower arms and legs, as a practical matter. In accordance with the invention each of these plurality of parts is treated alike, although each shape is distinctive according to the body part that it represents. That is, each part 21–27 is mounted and articulated and weight applied thereto in a common manner and, therefore, a description of one part 21–27 as it is related to the means D through F will suffice for all. However, it is to be understood that the said parts have certain characteristics and are related to each other as follows: since it is the posterior of the human anatomy that is normally depressed into a bed or mattress it is only this side of the human body that will be considered here, but it is to be understood that cases will arise when the anterior or other side parts resulting from odd positions will be depressed into the mattress and considered. With the posterior depression to be considered, each body part 21–27 is a light weight shell-like structure with a contour representing the equivalent part of the human body. For example, a normal sized human form is selected and its normal center of gravity is determined for each part 21–27. According to the invention, each body part is then pivotally connected to the means D, later described, and thereby supported for depression and retraction. Further, each separate body 21–27 abuts the next adjacent body part but without touching each other. Therefore, the individual body parts 21–27 are free to seek independent positions in the mattress when under pressure, thus affording articulated positions resembling natural articulated positions. As is clearly shown, each part 21–27 is a half shell part representing the part and contour of the posterior of the human body part that it simulates.

With the nature of the body parts 21–27 in mind the means depressing the same is to be considered. The weight means D that individually presses the parts 21–27 into the mattress underlying the header 11 is carried by the said header and involves weight guided so as to apply perpendicular force to each individual part 21–27. As shown, the means D involves a vertically disposed guide bearing 30 positioned above the center of gravity of each part 21–27, and a thrust rod 31 slidably carried in the bearing 30 so as to depend therefrom and carry the part (21–27). The rod 31 also projects well above the header 11 to be affected by the control means E, as later described.

In accordance with the invention the weight means D is such as to apply forces to the individual parts 21–27 corresponding to the weights of a given human body form. That is weights are applied so as to simulate, for example, a 300 lb. person, the maximum sized person to be simulated. In this case, the parts 21–27 are individually weighted to correspond respectively to the weights of actual parts of a 300 pound person. In each instance the force in lbs. of pressure is applied by gravity through the body parts and by means of weighted bodies 21′–27′ carried at the parts 21–27, respectively. As a result, the combined parts 21–27 when free to be acted upon by gravity simulate a 300 lb. person.

The weight control means E is provided so as to limit the force applied by the bodies 21′–27′ and is essentially a weight subtracting means. As shown, there is a weight subtracting means at each part 21–27 and each operates individually upon a part 21–27, and said means operate together or in unison. In accordance with the invention, the control means E at each body part 21–27 involves a weight subtracting means that operates to remove the weight as applied by the body 21′–27′. Therefore, bodies 21″–27″ are provided and these bodies correspond in weight, or they are proportioned in weight to the bodies 21′–27′ specified above. In each instance, the force in pounds of pressure from the bodies 21″–27″ is applied by gravity of said body carried on the uppermost end of a force rod 33 slidably carried in a bearing 34. The rod 33 and bearing 34 are supported by the header 11, and in accordance with the invention the lower end of the rod 33 and upper end of the rod 31 occur, when in a normal position, at a given horizontal plane and on laterally spaced axes. That is, the axes of the rods 31 and 33 are spaced and parallel. In each case, the rods 31 and 33 are free to slide vertically, rods 31 applying gravitational force of the basic weights 21′–27′, and rods 33 applying gravitational force of the subtraction weights 21″–27″.

In accordance with the invention and in order for the control means E to afford weight control of forces applied by the individual body parts 21–27, a balance is provided and involves, generally, a lever 35, supported by a fulcrum 36, and carried by a carriage 37. The lever 35 operates between the ends of the rods 31 and 33 that end in a common horizontal plane. The fulcrum moves beneath the lever and is selectively positioned by the carriage 37. It is to be understood that there is a lever 35 for each pair of rods 31 and 33; however, there need be but one carriage 37 to carry a multiplicity of fulcrums 36. Furthermore, and as shown, there can be more than one carriage, for example, two carriages 37 and 37′. In the particular case illustrated there is one carriage 37 that shifts the fulcrums 36 for the means C and D relating to the head part 21, thorax part 22, and upper arm parts 24, and there is one carriage 37′ that shifts the fulcrums 36 for the means C and D relating to the pelvis part 23, lower arm parts 25, and upper and lower leg parts 26 and 27. As shown, these two carriages 37 and 37′ move oppositely in directions disposed longitudinal of the machine structure.

Carriages 37 and 37′ are alike and each is a framework that moves longitudinally of the header 11 and is supported thereby. It is preferred that said carriages be supported on rollers so as to be free to move and the carriages are characterized by transverse members that support the fulcrums 36, also in the form of rollers. When the machine is in a normal unactuated position between the rods 31 and 33, in which case the bodies 21″–27″ balance with the bodies 21′–27′ (the rods 31 and 33 and their associated parts can weigh the same). Therefore, the carriages 37 and 37′ are to be shifted from said normal position toward the rods 31 in order for the bodies 21″–27″ to be effective in subtracting weight from the parts 21–27. As shown, the levers 35 are pivotally engaged at their ends with the respective rods 31 and 33 and in the particular case illustrated there is a pivot pin connection between the rod 31 and lever 35 and a roller connection between the rod 33 and lever 35. The said roller connection acts upon the upper face of the lever 35 to act downwardly whereby shifting of the fulcrum 36 causes proportional changes in the subtraction of weight.

The control means E also involves means to position the carriage 37 (or 37′) in order to selectively place the fulcrum 36 (or fulcrums 36) relative to the lever 35. This feature of the control can vary widely and is preferably in the form of a device that can establish a predetermined or pre-set position of the carriage. As shown, there is a revolvable cylinder 39 with a circumferential series of axially disposed stops 40, each stop being of predetermined pre-set axial extent (see FIG. 5). The cylinder 39 is revolved into any one of a plurality of positions where a single stop 40 is engageable with the carriage 37 to limit movement of the same. Since there are two oppositely moving carriages 37 and 37′, there are two opposed cylinders 39 and stops 40 journalled on a common control shaft that is manually positioned. Thus, the fulcrums are stopped in manually selectable positions, all as circumstances require.

The drive means F is adapted to motivate the carriage 37 (and 37′) to shift the fulcrums 36. As shown, there is a drive shaft 41 that is oscillated by a cylinder and piston mechanism 42 through a lever 43. The shaft 41 turns a cross-arm 44 that is connected to the carriages 37 and 37′ by links 45 and 45′, whereby the carriages move oppositely either to shaft away from or toward each other. A suitable valve and fluid pressure control system is provided to cycle the machine as may be required.

From the foregoing it should be clear that the multiplicity of individual parts C simulate the human body form, ranging from a selected maximum weight person to a person of minimum weight. In the broadest sense, the present invention involves the variable application of weights to the various individual parts 21–27, and it involves the withdrawal of said weights. In its preferred form the invention contemplates the withdrawal of a portion of the weight from each part 21–27, said parts being initially weighted to a maximum amount. However, it is equally feasible in the broad sense to simply apply said weights as necessary.

In practicing the present invention, useful results are observed and recorded. It is, of course, the motion of the parts 21–27 that is to be observed, and particularly the amount or degree of depression of said parts into the mattress M being tested. In order to operate the machine the box springs 8 and/or mattress M are positioned on the table 15 and the screw jacks 16 are operated to lift them into touching engagement with the parts 21–27. The drive means F is then operated to shift the carriage or carriages 37–37', in order to move the fulcrums 36. Prior to said operation, the control means E has been selectively adjusted by positioning of the cylinder or cylinders 39 to the end that movement of the carriage and fulcrums is limited, and whereby the desired proportion of weight of the bodies 21'–27' is reapplied, said fulcrums having been moved from a normally balanced position determined by stops 49.

Observation and/or recording of the depression of each individual rod 31 is made by, for example, providing a graph and stylus mechanism 50. The graph 51 is mounted to move the carriage 37 (or 37') while the stylus 52 is carried by the rod 31 to move therewith. When the stylus is brought into writing engagement with the graph the resulting movement of the carriage 37 and rod 31 is recorded and can be readily observed. The longitudinal movement of the carriage causes the weight applied to be recorded, while the depression of the rod 31 causes the function of the mattress M to be recorded. It will be readily apparent that the said depression of rod 31 will vary depending upon the mattress M and the functions thereof.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. Apparatus for simulating the depression of the human form into bedding, and including:
    (a) means to support the bedding,
    (b) a plurality of independent weighted parts positioned to rest upon the bedding and each having a contour and a center of gravity simulating a part of the human body form,
    (c) and controlled means comprising a lifting lever for each of said plurality of parts and adapted to selectively apply force to simultaneously lift each part respectively.

2. Apparatus for simulating the depression of the human form into bedding, and including:
    (a) means to support the bedding,
    (b) a plurality of independent weighted parts positioned to rest upon the bedding and each having a contour and a center of gravity simulating a part of the human body form,
    (c) and controlled means comprising a lifting lever for each of said plurality of parts, and a selectively shiftable fulcrum to support each lever, and adapted to apply force to lift each part respectively.

3. Apparatus for simulating the depression of the human form into bedding, and including:
    (a) means to support the bedding,
    (b) a plurality of independent parts positioned to rest upon the bedding and each having a contour and a center of gravity simulating a part of the human body form,
    (c) a weight applied to the center of gravity of each of said plurality of parts,
    (d) and controlled means connected to each of said parts and each comprising a lifting lever, and a selectively shiftable fulcrum to support the lever, and adapted to apply force to lift the part to which it is connected.

4. Apparatus for simulating the depression of the human form into bedding, and including:
    (a) means to support the bedding,
    (b) a plurality of independent parts positioned to rest upon the bedding and each having a contour and a center of gravity simulating a part of the human body form,
    (c) a weight applied to the center of gravity of each of said plurality of parts,
    (d) controlled means connected to and to lift each part respectively, and each of said controlled means comprising a lever a shiftable fulcrum to carry said lever, and a weight on said lever at the end thereof which is opposite the connection to the part associated therewith.
    (e) and a movable carriage to support the fulcrums and shiftable to effect simultaneous control of said controlled means.

5. Apparatus for simulating the depression of the human form into bedding, and including:
    (a) means to support the bedding,
    (b) a plurality of independent parts positioned to rest upon the bedding and each having a contour and a center of gravity simulating a part of the human body form,
    (c) a weight applied to the center of gravity of each of said plurality of parts,
    (d) controlled means connected to and to lift each part respectively, and each of said controlled means comprising a lever, a shiftable fulcrum to carry said lever, and a weight on said lever at the end thereof which is opposite the connection to the part associated therewith,
    (e) a movable carriage to support the fulcrums and shiftable to effect simultaneous movement of the fulcrums,
    (f) and a drive to shift the carriage a predeterminable distance.

References Cited by the Examiner
UNITED STATES PATENTS

| | | | |
|---|---|---|---|
| 1,395,530 | 11/21 | Strane | 100—237 |
| 2,301,841 | 11/42 | Zeder | 73—161 |
| 3,067,608 | 12/62 | Nirenberg et al. | 73—94 |

RICHARD C. QUEISSER, *Primary Examiner.*

ROBERT EVANS, *Examiner.*